Figure 1:
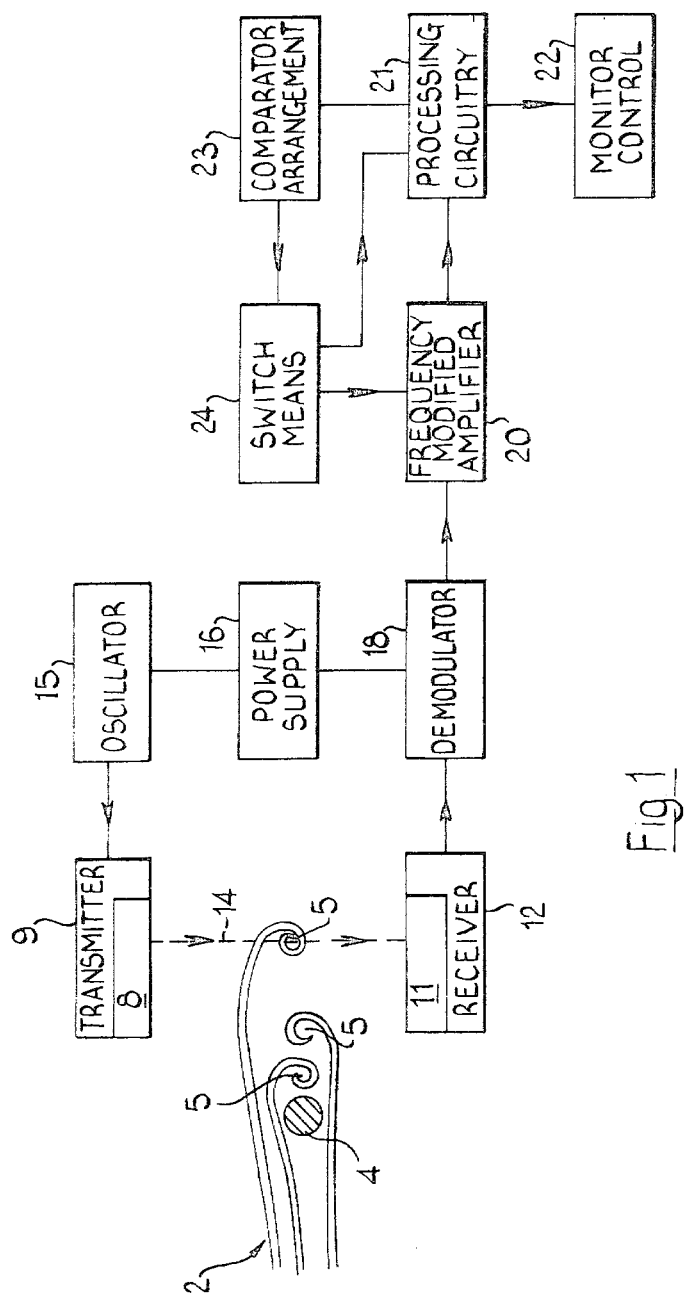

United States Patent [19]

Harrington

[11] 4,318,303
[45] Mar. 9, 1982

[54] FLUID FLOW MONITORS

[75] Inventor: Pete F. Harrington, Ashby-de-la-Zouch, England

[73] Assignee: Coal Industry (Patents) Limited, London, England

[21] Appl. No.: 206,230

[22] Filed: Nov. 12, 1980

Related U.S. Application Data

[63] Continuation of Ser. No. 29,965, Apr. 13, 1979, abandoned.

[30] Foreign Application Priority Data

Apr. 26, 1978 [GB] United Kingdom ............... 16473/78

[51] Int. Cl.³ ............................................... G01F 1/32
[52] U.S. Cl. ................................................. 73/861.23
[58] Field of Search .......... 73/861.22, 861.23, 861.24, 73/861.32, 861.34, 861.18

[56] References Cited

U.S. PATENT DOCUMENTS

| 2,887,878 | 5/1959 | Kamp et al. | 73/861.16 |
| 3,362,221 | 1/1968 | Eller et al. | 73/861.16 |
| 3,709,034 | 1/1973 | Herzl | 73/861.18 |
| 3,995,482 | 12/1976 | Kissel | 73/861.34 |

FOREIGN PATENT DOCUMENTS 1483817 8/1977 United Kingdom .

*Primary Examiner*—Charles A. Ruehl
*Attorney, Agent, or Firm*—James C. Wray

[57] ABSTRACT

A fluid flow monitor of the sort which detects the rate of formation of Karman vortices caused by a blunt obstruction in a fluid stream. The invention mitigates problems associated with the formation of spurious electrical signals not related to the Karman vortices by providing an amplifier which amplifies frequencies selected by a comparator arrangement the comparator arrangement being controlled by the value of a further signal proportional to the number of detected Karman vortices.

11 Claims, 7 Drawing Figures

FLUID FLOW MONITORS

This application is a continuation of Ser. No. 029,965, Apr. 13, 1979, abandoned.

The present invention concerns improvements in or relating to fluid flow monitors.

Fluid flow monitors detect movement of liquids or gases such as air and may use, for example, Pitot or Venturi tubes. Such monitors are often not entirely satisfactory because they require reading corrections to be made to allow for variations in the fluid away from calibration standard, for example, variations in atmospheric properties away from sea level.

Other types of monitor may employ a vane which is disturbed by relative movement of the fluid. Such monitors suffer from the disadvantage that in some environments, for example, an underground coal mine, they are susceptible to mechanical damage or the vane can become contaminated with dust.

Other types of fluid monitor rely on vortex shedding ie. on the vortices produced in a flowing fluid when a blunt obstruction is placed in the fluid flow. The rate of vortex production is proportional to the velocity of the fluid relative to the obstruction and for certain ranges this proportionality will be a near approximation to linear.

These types of fluid flow monitor can detect the vortices produced in a variety of ways. For example strain gauges can sense strain in members disposed in the fluid, which strain is caused by the vortices. Piezoelectric crystals, heated wires and thermistors, and diaphragms can also be used to detect the vortices.

Alternatively, a sonic signal is projected from a transmitter to a sonic receiver, the path of the sonic signal intersecting the vortex trail, at some point. Electrical circuitry converts the received sonic signal into an electrical signal and detects from this signal the frequency of the vortices which modulated the sonic signal.

Problems can arise with the vortex shedding type of monitor insofar as interference can mask the detection of vortices particularly at low fluid flow rates. An object of the present invention is to mitigate the above mentioned problem.

According to a first aspect of the present invention, a fluid flow monitor comprises a transducer means which is disposable in a fluid flow, the transducer means being constructed to derive an electrical signal including modulations associated with vortices produced in the fluid flow, processing circuit means for processing the electrical signal and deriving a further electrical signal dependent upon the fluid flow and comparator means for comparing said further electrical signal with preselected reference signals, the comparator means having an output dependent upon the comparison with said preselected reference signals, which output is arranged to control said processing circuit means in response to the comparison.

According to another aspect of the present invention, a fluid flow monitor of a type wherein a sonic transmitter transmits a sonic signal into the fluid flow and a sonic receiver receives the sonic signal, the sonic signal being modulated by vortices in the fluid flow, comprising a transducer means associated with the sonic receiver for converting the received sonic signal to an electrical signal modulated at the frequency of passage of the vortices, demodulating means for demodulating the electrical signal, processing circuit means for producing a further electrical signal from the demodulated signal, the further signal having magnitude dependent upon the modulation frequency of the electrical signal and comparator means for comparing said further electrical signal with preselected reference signals, the comparator means being arranged to have an output dependent upon the comparison with said preselected reference signals, and the output of the comparator means being arranged to control said processing circuit means in response to the comparison.

Preferably, the processing circuit means includes a variable frequency amplifier in which case the comparator means derives an output signal to control frequencies amplified by the amplifier. Conveniently, the comparator means screens out high modulation frequencies when the further signal has a magnitude indicative of a low modulation frequency.

Advantageously, the comparator means comprises a plurality of comparators, each of which can switch at one or more of the preselected reference signals.

Advantageously, the monitor includes variable monitoring scales.

Preferably, selection of the scales can be effected remotely from the monitor.

Advantageously, selection of different scales does not alter the frequencies which are screened out.

Preferably, the monitor has a variable time constant in operation so that fluctuations of the further signal are removed.

Advantageously, a warning is given if the further signal falls below a first preselected level, rises above a second preselected level or rises above or falls below a third preselected level.

Preferably, power to the monitor is cut off if the power supply voltage to the monitor falls below a preselected voltage level.

Figure 2:
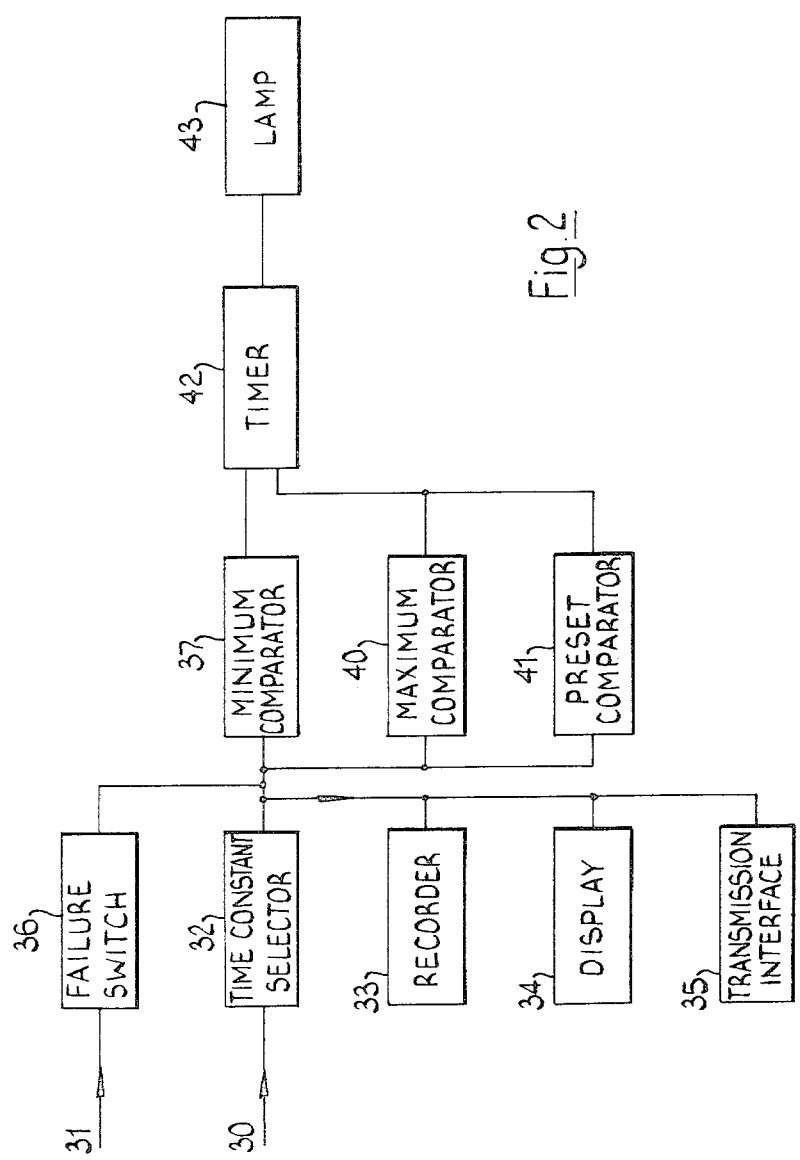
Figure 3A:
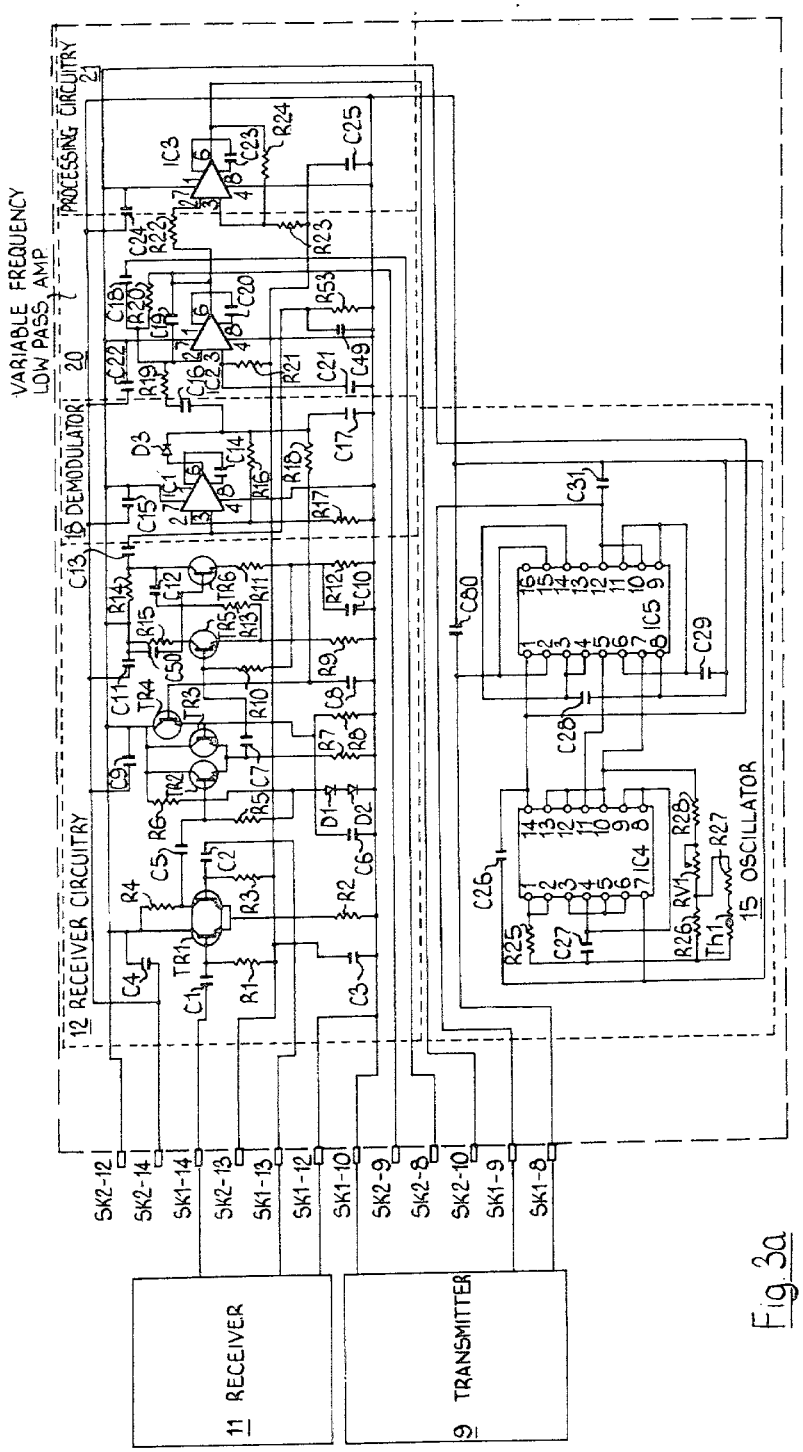
Figure 3B:
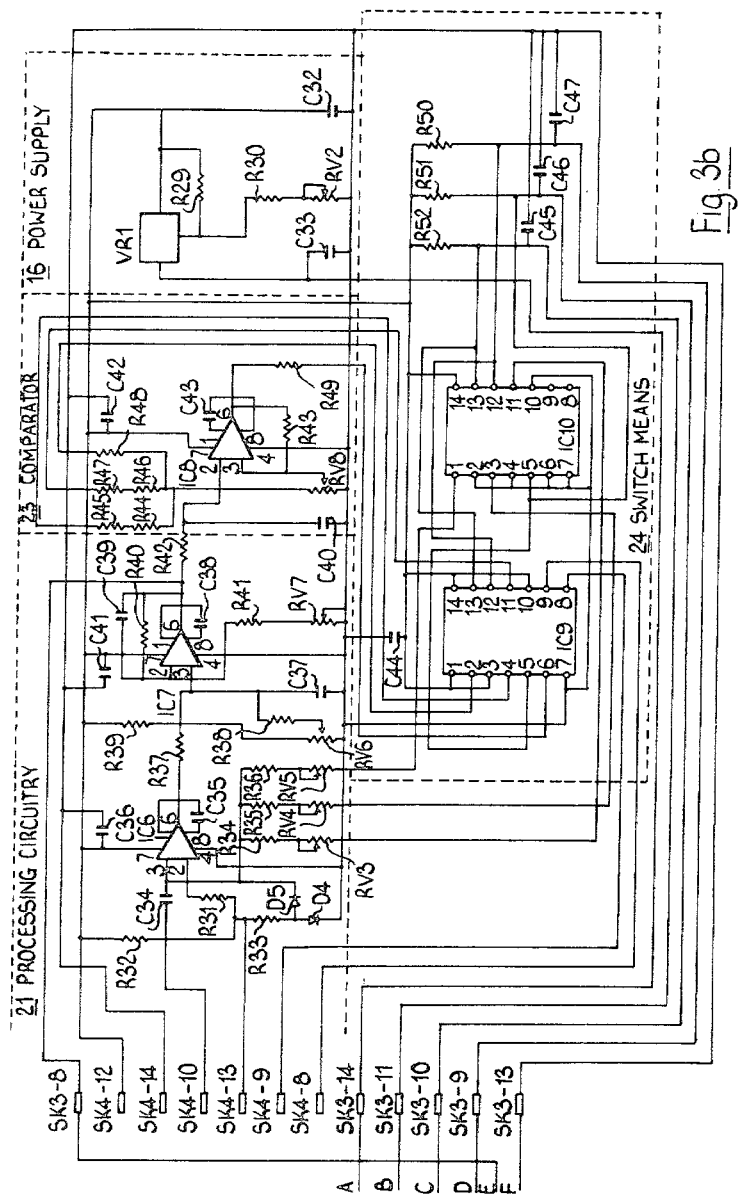

An embodiment of the present invention will now be described, by way of example only, with reference to the accompanying drawings in which:

FIG. 1 is a schematic diagram showing a fluid flow and part of the circuitry of a fluid flow monitor in block form, FIG. 2 is a block electrical circuit diagram showing a further part of the circuitry of the monitor, FIG. 3a, and 3b show a detailed electrical circuit diagram of part of FIG. 1, and FIGS. 4a, 4b, and 4c show a detailed electrical circuit diagram of part of FIG. 2.

Referring to FIG. 1, fluid flow lines are generally shown at 2. A blunt obstacle 4 is placed in the fluid flow and some of a succession of vortices produced in the flow by the obstacle are shown at 5. A sonic transmitter is indicated at 8 and an electrical circuit associated therewith at 9. A sonic receiver is shown at 11 and its associated electric circuit at 12. A sonic signal is transmitted by the transmitter to the receiver and this sonic signal is schematically indicated by a dotted line 14. The sonic signal traverses the vortex trail and vortices through which the signal passes modulate the amplitude of the signal.

The transmitter is driven by an oscillator 15 powered by a supply 16, the oscillator generating an approximately 150 kilohertz alternating square drive signal. The electrical circuit 9 and the transmitter 8 convert the driving signal into the sonic signal which is then modulated by the vortices in the range of about 10 to 2000 Hz. The receiver 11 then receives the amplitude modulated sonic signal and reconverts it to an electrical signal.

The receiver is connected to a demodulator 18 which in turn is connected to a variable frequency low pass amplifier 20. The amplifier 20 operates only upon signals of which the frequency is determined by circuit components which are described in more detail below with reference to FIG. 3. The output of the amplifier 20 is processed by processing circuitry 21 and magnitude of the output signal from this circuitry is proportional to the frequency of the signal from the demodulator 18. The output signal from the processing circuitry 21 is fed to a monitor control 22 for use in a variety of ways as described below and including display and recording. A comparator means 23 is also connected to the output of the processing circuitry and this comparator means compares the magnitude of the output from the circuit 21 with preselected reference levels and the output of the comparator means can adopt several discrete levels depending upon whether the circuit output exceeds or is less than the reference values. The comparator means 23 comprises a plurality of discrete integrated circuit or discrete component comparators. A switch 24 is connected to the comparator means output and the output of the switch is fed back to the amplifier 20. The switch is controlled by the output of the comparator means 23 and either connects in or removes one or more of the previously mentioned circuit components associated with the amplifier 20 to thus modify the frequency of signal which the amplifier 20 amplifies.

In operation of the circuitry of FIG. 1 then, an electrical signal of about 150 kilohertz is effectively modulated by a signal of the order of say 50 Hertz. The modulation actually being effected by fluid vortices which vary the magnitude of a sonic signal. Clearly the frequency of amplitude modulation of the sonic signal is proportional to the number of vortices which cross the signal path and hence to the fluid flow velocity. Thus the frequency with which the electrical signal is modulated, taken in the example as 50 Hertz is proportional to the fluid flow velocity.

The electrical signal is demodulated by the demodulator 18 and the demodulated low frequency (50 Hertz) signal amplified by amplifier 20. It happens, in practice, that the low frequency signal can carry spurious high frequency signals throughout its range and this becomes a problem when the actual frequency is towards the lower end of the range (ie towards zero Hertz). These spurious signals are introduced somewhere in the sonic transmitter and receiver and the oscillator but their exact source is indeterminate. Owing to the presence of these spurious signals it is important that the amplifier 20 tends to cut out frequencies towards the upper end of the low frequency range when the actual low frequency signal is towards the lower end of the range. The frequencies which the amplifier amplifies are determined by the values of circuit components (examples of which are shown in FIG. 3) associated with the amplifier.

In any case, the low frequency signal, which apart from the spurious signals is substantially proportional to the fluid velocity, is fed to the processing circuitry 21. As has been explained above the processing circuitry 21 produced a further signal whose magnitude is proportional to the frequency of the low frequency signal and this further signal is fed to the monitor control for use as a signal which indicates fluid velocity.

The further signal is also utilized by the comparator means 23 to tend to overcome the problem of the above mentioned spurious signals. Since the spurious signals are more of a problem towards the lower end of the low frequency range it is desirable that the comparator means 23 cause the amplifier 20 to reject amplification of signals towards the upper end of the low frequency range when the actual signal is towards the lower end. The comparator means does this by comparing the magnitude of the further signal with reference values which correspond to values of the further signal in the lower portion of its range. If the further signal exceeds the reference values then respective circuit components for each reference value associated with the amplifier 20 are switched out by the switch 24 and if the further signal does not exceed the respective reference values then these components are switched in, the operational mode of the switch being determined by which of the discrete output values the comparator means 23 adopts.

Turning now to FIG. 2, there is shown in block form an electrical control circuitry for utilizing the value of the further signal produced by the processing circuitry 21 described above. The further signal is shown inputting into the control circuitry at 30. It passes first to a time constant selector 32 wherein fluctuations are damped out of it depending upon the value of time constant selected in the selector. A power input for the control circuitry is shown at 31 and a failure switch 36 is situated in the power line. The failure switch turns off power to the circuitry if the supply voltage (which is from a battery) falls below a preselected desired value.

The output from the time constant selector is fed to a recorder unit 33, a display unit 34 and a transmission interface 35 for recording, display and other centralized uses.

The output from the time constant selector 32 is further utilized by three comparators 37, 40 and 41 which compare the signal with three desired reference values as is explained subsequently. The comparators 37, 40 and 41 control an integrated circuit timer 42 which in turn controls the flashing of a lamp 43.

In normal use, the lamp 43 flashes every sixteen seconds to indicate that the monitor is operating. The comparator 37 causes the flashing of the lamp to be inhibited if the output from the time constant selector 32 falls below a minimum level. The comparator 40 similarly causes the lamp 43 to be inhibited if the output from the selector exceed a maximum value. The comparator 41 compares the output from the time constant selector 32 with a preselected value in the operating range of the output and should the output fall below the preselected value, the flashing of the lamp 43 is changed to once per second.

Referring now to FIG. 3 (ie FIGS. 3*a*, 3*b* and 3*c*) the circuit parts 15, 16, 18, 20, 21, 23 and 24 of FIG. 1 are described in more detail. The circuitry associated with the transmitter is again shown at 9 and that associated with the receiver at 12.

The oscillator 15 is a buffered frequency stable oscillator comprising integrated circuits IC4 and IC5 and their associated circuit components resistors R25, R26, R27, R28, thermistor Th1, variable resistor RV1 and capacitors C26, C27, C28, C29, C30 and C31. The integrated circuit IC4 is an RC oscillator the frequency of which is temperature stabilised by the thermistor Th1 and the resistors R25 and R28 mentioned above. The variable resistor RV1 is used to set the frequency of the oscillator. The integrated circuit IC5 is a buffer driver stage which isolates the oscillator IC4 from the driven stage.

The driving signal which is a square wave of approximately 150 KHz drives the transmitter circuitry 9. In the figure, sockets are indicated by the abbreviation SK and line numbers by a number after the socket number. Socket 1 connects the circuitry to the transmitter and receiver. Socket 2 (SK2) is connected to socket 4 to connect two separate parts of the circuitry. Socket 3 (SK3) connects the circuitry of FIG. 3 to that of FIG. 4 to be described below. Power for the oscillator IC4 and the driver IC5 is taken from a source to be described below along lines from SK2-12 and SK2-14. The square wave drive signal to the transmitter 9 is taken from the buffer driver IC5 via lines SK1-8 and SK1-9. The signal received by the receiver 12 is returned to the circuitry via lines SK1-13 and SK1-14. Line SK1-10 and SK1-12 to the transmitter and receiver, respectively are screening lines. The receiver signal is the 150 KHz drive signal amplitude modulated at about in the range 0–700 Hz as has been explained previously in connection with FIG. 1.

The signal from the receiver is fed to a differential amplifier comprising transistors TR1. The power for the circuitry as has been mentioned is provided on lines SK2-12 and SK2-14. The signal from the receiver is connected to the bases of the transistors in TR1 and the output from the differential amplifier is from the collectors of the transistors TR1. Circuit components comprising resistors R1, R2, R3, R4 and R5 and capacitors C1, C2, C3, C4 and C5 are associated with the differential amplifier TR1. The differential amplifier TR1 has a high common mode rejection ratio because R2 is high and TR1 is symmetrical. A balanced push-pull output is provided by the differential amplifier TR1.

The output from the amplifier TR1 is fed to an automatic gain control attenuator comprising TR2, TR3 and TR4 together with their associated circuit components and a constant gain output stage provided by transistors TR5 and TR6 and their associated circuit components. The signal from TR1 is applied to the base of TR2. The output from the attenuator is from the emitters of TR2 and TR3. The attenuator TR2, TR3 and TR4 has associated therewith resistors R6, R7 and R8 and capacitors C6, C7, C8 and C9 and diodes D1 and D2. The constant gain output stage TR5, TR6 the input of which is to the base of TR5 and the output of which is at the collector of TR6 has associated therewith circuit components comprising resistors R9, R10, R11, R12, R13, R14 and R15 together with capacitors C10, C11, C12, C13, C15 and C50.

The reference voltage for the attenuator is supplied by the diodes D1 and D2. The automatic gain control voltage is applied to the base of transistor TR4 from the output of an integrated circuit IC1 which is described in more detail below. The constant gain stage provided by the Transistors TR5 and TR6 is stabilized by feed back through capacitor C12 and resistors R13, R9 and R11.

The output from the collector of TR6 is fed via a capacitor C13 to a non inverting input 3 of the previously mentioned integrated circuit IC1. A capacitor C14 is associated with the integrated circuit IC1. A diode D3 is associated with the integrated circuit IC1 which latter forms an active detector with a small low frequency gain derived from a combination of resistors R16 and R17 which feed back from the output of IC1 to the non-inverting input and the common negative supply rail SK1-10. The integrated circuit IC1 has a high input impedance but this is brought down by a resistor R53 and capacitor C49 to the value thereof.

The low frequency output from the integrated circuit IC1 is developed across a capacitor C17. The signal across the capacitor C17 has a direct current component which settles down in operation to about 2.0V. The output from IC1 is also fed back, as has been mentioned, to the automatic gain control of the attenuator TR2, TR3, TR4, the feeding back being via a resistor R19 and a time constant capacitor C8.

The low frequency signal from the integrated circuit IC1 is fed to an inverting amplifier IC2. The inverting amplifier IC2 has the following circuit components associated therewith, resistors R19, R20 and R21, capacitors C16, C18, C19, C20, C21 and C22 and in addition integrated circuits IC9 and IC10 which are described below. The inverting amplifier IC2 has a basic gain of 90 but this gain is modified at the low frequency range of interest (10 to 700 Hertz) by the capacitors C18 and C19 which are feedback capacitors. In operation capacitors C18 and C19 are switched in parallel below about 100 Hz but C18 is switched out above about 100 Hz by the integrated circuit IC9 which is described below.

As has been mentioned in connection with FIG. 1, spurious signals are derived by the transmitter, receiver and drive circuitry, to cause a problem at low frequencies and especially when the actual signal is below about 100 Hz; said spurious signals being towards the upper end (ie towards 700 Hertz) of the range of interest. When C18 and C19 are switched in parallel then the frequency response of IC2 towards the upper end (towards 700 Hertz) is damped so that the spurious signals are damped. However, when C18 is switched out, the signals towards the upper end of the frequency range are not damped out so that when the actual signal is towards the upper end of the frequency range it is not damped out.

Although in the interests of simplicity only two capacitors C18 and C19 are shown in FIG. 3, more could easily be provided. If more were provided, the gradual variation in attenuation of high frequency signals could be attained throughout the range of interest. Thus high frequencies would be heavily damped when low frequencies were being measured and as the measured frequency when up the capacitors could be switched out one by one to provide progressively less damping as the frequency rises towards the upper end of the range of interest. Such a progression in damping is also advantageous in that it causes the measured frequency signal to be of a substantially uniform shape throughout the range of interest rather than allowing discontinuities to occur with the sudden introduction of noise as may occur at about 100 Hz in the above described operation of C18 and C19.

In the arrangement described above, the dampening is always calculated to damp out spurious noise as far as possible but not to damp out signals towards the upper end of the range of interest. This of course is why the capacitors must be switched out one by one, for although ideal damping at say 150 Hz may be provided by say four capacitors, such damping may mask, the actual signal at 200 Hz at which frequency say three capacitors would be ideal.

The signal from IC2 is passed to a differential amplifier IC3 acting as a Schmitt trigger. The following circuit components are associated with IC3, resistors R22, R23 and R24 and capacitors C23, C24 and C25. The Hysteresis or backlash of the Schmitt trigger IC3 is provided by the ratio of R24 to R23. The Schmitt trigger IC3 squares the output from IC2. The output from the Schmitt trigger is fed from socket 2 to socket 4 along line 10.

The signal along SK4-10 is fed to a pulse forming circuit whose main component is an integrated circuit IC6. Associated with the circuit IC6 are the following circuit components, resistors R31, R32, R33, R34, R35, R36 and R37 variable resistors RV3, RV4 and RV5, capacitors C34, C35 and C36 and diodes D4 and D5. The incoming square wave to the pulse shaping circuitry is differentiated by the capacitor C34 and one of the resistors R34, R35 or R36 together with its respective trimmer RV3, RV4 or RV5, the one of the resistors being determined the integrated circuits IC9 and IC10 to be described below. Positive pulses of three different width are produced at the non inverting input 3 of the integrated circuit IC6. The corresponding negative pulses are removed by the diodes D4 and D5. The integrated circuit IC6 has a high open circuit gain so that the positive pulses are squared and limited to produce standard positive pulses of different widths determined by which of the resistors R34, R35 or R36 is selected. The standard pulse output from IC6 is fed to a further integrated circuit IC7 via the resistor R37.

The integrated circuit IC7 is integrating circuit and has the following circuit components associated therewith, resistors R38, R39, R40, R41 and R42 variable resistors RV6 and RV7 and capacitors C37, C38, C39, C40 and C41. IC7 also produces a 0.4 volt zero offset for the signal. This is necessary so that in the event of system failure a fall to zero volts indicates system failure and cannot be confused with no air flow. The variable resistor RV6 is adjusted to set the voltage on C37 to 0.2 V for no signal from IC6. The variable resistor RV7 is then adjusted to give IC7 a gain of 2 so that the 0.4 volt zero offset is obtained. Incoming pulse from IC6 via R37 charge up the capacitor C37 from the datum value. A small operational time constant is introduced into the integrating circuit by the capacitor C39 and the resistor R40. Thus there appears on the low inpedance output of IC7 an analogue voltage, the magnitude of which is proportional to the frequency of pulses from IC6 and therefore proportional to the number of vortices intersected per unit time in the fluid stream by the sonic signal.

This analog voltage is taken from the output of IC7 via line SK3-8 to the control circuitry to be described below with reference to FIG. 4. The analog voltage is also taken to a comparator IC8 and its associated circuit components resistors R43, R49, variable resistor RV8 and capacitors C42 and C43. Also associated with the comparator IC8 is a resistor network comprising resistors R44, R45, R46, R47 and R48. This resistor network is provided to take account of range switching which has previously been mentioned in connection with resistors R34, R35 and R36 and with integrated circuits IC9 and IC10 and which will be mentioned in more detail below.

The comparator IC8 compares the analogue signal from IC7 with a reference value which is set by RV8. This reference value corresponds to a value of the analog signal representing about 100 Hz; R45, R47 or R48 ensuring that this value is maintained at 100 Hz whatever range is selected. The output of comparator IC8 is connected to pin 6 of the integrated circuit IC9 via the resistor R49. The output of the comparator IC8 controls part of the integrated circuit IC9 which is a solid state switching circuit, the part being pins 8 and 9, in the following way. When the analog signal from IC7 is below the reference level on RV8, then the capacitor C18 mentioned above in connection with IC2 is switched in and when the analog signal exceeds the reference value, then C18 is switched out. Consequently for frequencies of about 0–100 Hz, the frequencies towards the upper end of the range (towards 700 Hz) are damped and for frequencies of over 100 Hz then frequencies towards the upper end of the range are not damped. In this way the problem of spurious high frequency noise which spurious noise causes problems especially at low frequencies tends to be overcome.

Only one comparator IC8 is shown in FIG. 3 for simplicity but as has been mentioned in connection with FIG. 1, a plurality of comparators such as IC8 could be provided, each comparator controlling a comparator such as C18 but having a different value in range of the analog signal. Thus, for example, comparators could cause a varying degree of damping at several frequencies such as 50 Hz, 100 Hz, 150 Hz, 200 Hz, 250 Hz, and 300 Hz. Six comparators would be needed to effect such varying damping and each would have a separate reference value. The resistor network would still cause the switching frequencies to be the same whatever range was selected.

The reference values at which the capacitors switch are calculated according to the principles outlined above such that maximum damping is always obtained commensurate with minimum attenuation of the frequencies being measured to provide the analog signal.

The integrated circuit IC9 and IC10 also have other switching functions associated with range changing as has been mentioned above.

The fluid flow monitor can operate for three range of fluid velocities as the one of the three ranges is selected along a respective one of the three lines SK3-0, SK3-10 or SK3-11, the respective one of the three lines not being connected to the power line SK3-14 by a remote switch. The lines Sk3-9, SK3-10, and SK3-11 are connected to pins 12, 5 and 13 respective of IC9 and IC10. Depending upon which of pins 12, 5 or 13 is selected, one of the resistors R34, R35 and R36 connected to pins 11, 3 or 1 on IC10 is selected. Consequently, the pulse width of the signal from IC6 is modified as explained above depending upon which of the ranges has been selected.

Likewise depending upon which of pins 12, 5 or 13 is selected, either R44 and R45 or R46 and R47 or R48 is selected as the reference value for the comparator IC8.

From the last foregoing two paragraphs, it can be seen that the switching frequency of IC8 which controls the switching in or out of C18 is about 100 Hz whichever of the three ranges is selected.

The power for the circuitry of FIG. 3 is provided from a voltage regulator VR1 shown to the right of the comparator IC8. The regulator VR1 is a basic 6 volt 1 amp overload protected solid state regulator which is modified by resistors R29, R30 and variable resistor RV2. Capacitor C32 and C33 are associated with VR1.

Figure 4A:
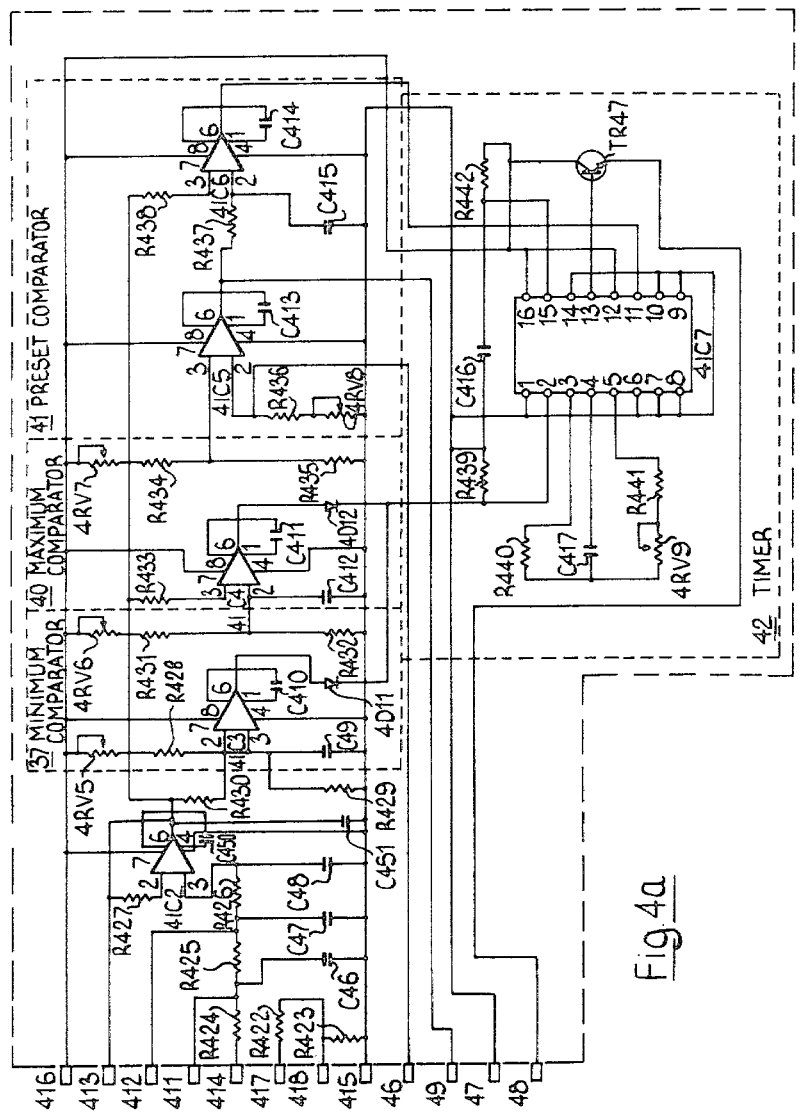
Figure 4B:
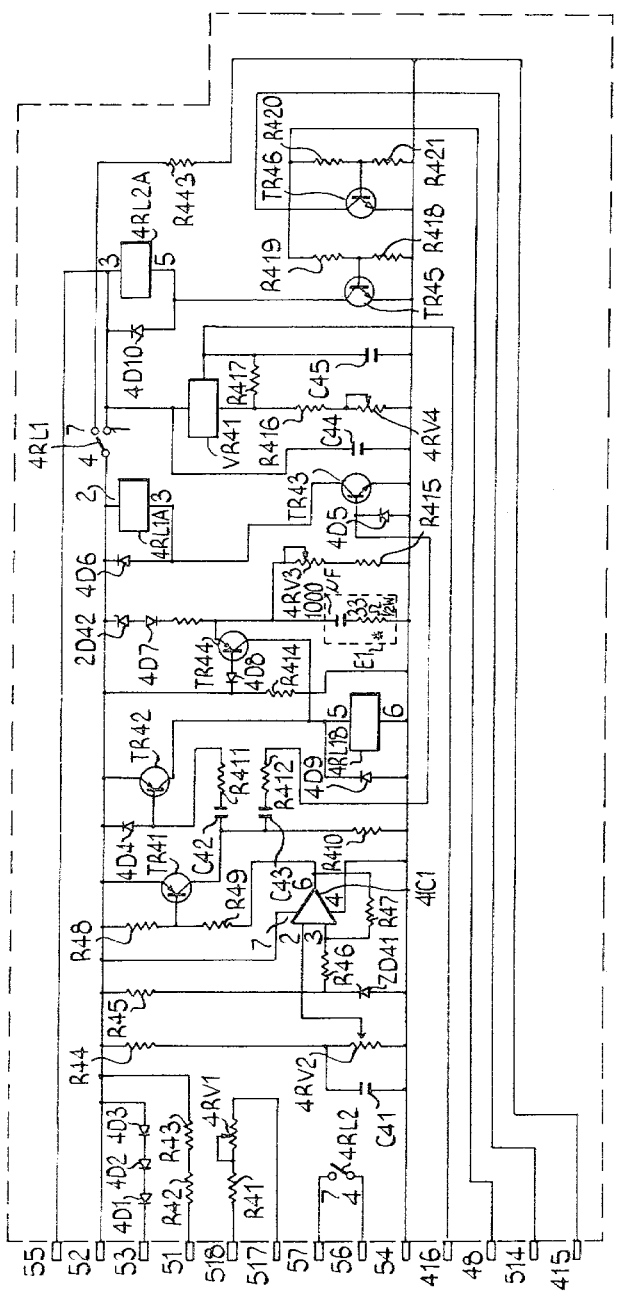
Figure 4C:
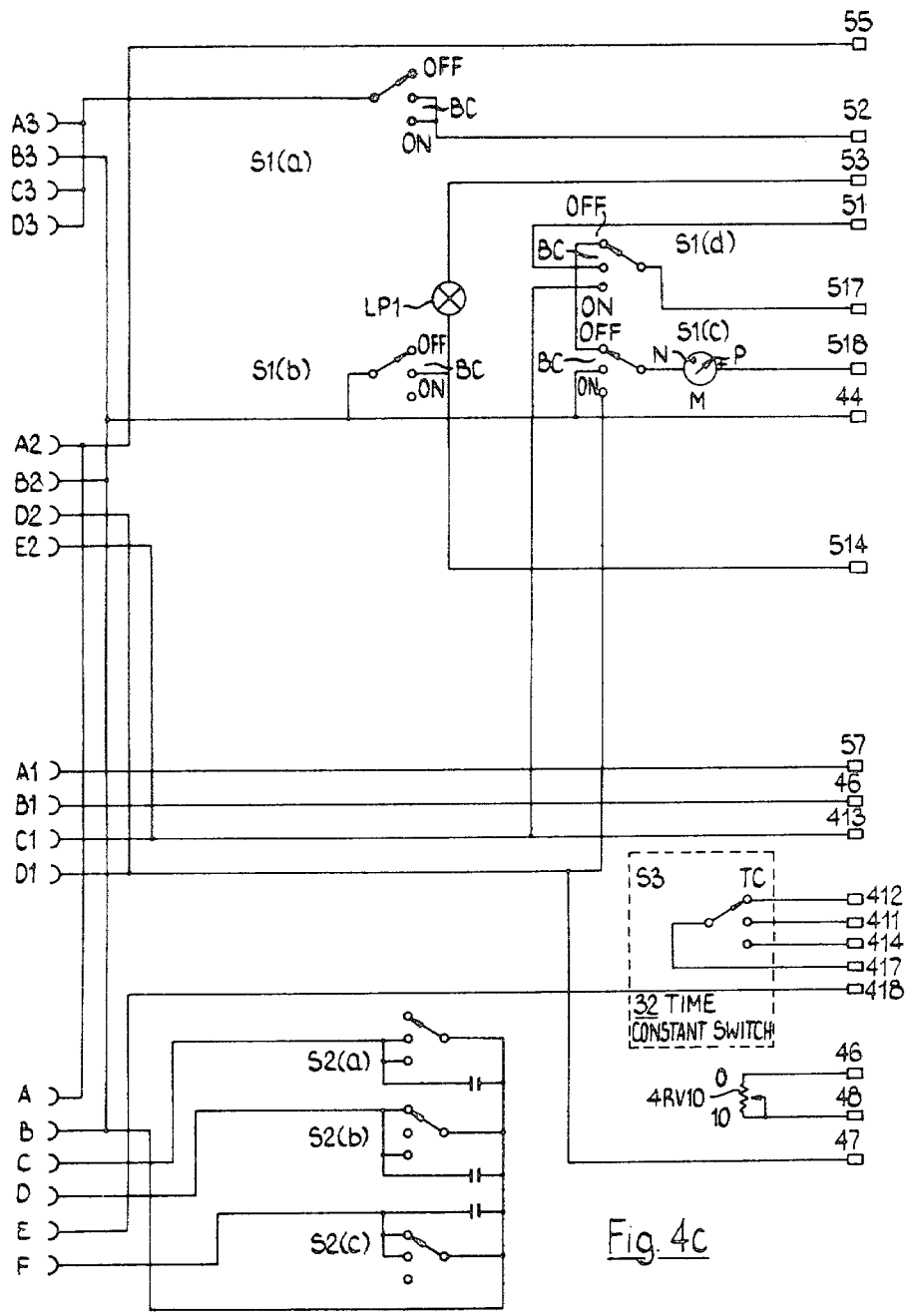

Referring now to FIG. 4, (ie FIGS. 4a, 4b and 4c) control circuitry for the fluid velocity monitor is shown. This circuitry is in a separate module to that of FIG. 3, the connections to FIG. 3 being shown at ABC-DEF in both Figures.

In FIG. 4C, adjacent to the inputs ABCDEF, there is shown a switch S2(a), S2(b), and S2(c). In the upper position of the switch D and F are connected to B, in the center position C and F are connected to B and in the lower position C and D are connected to B. The switch S2 is the range selector switch mentioned above in connection with FIG. 3. Input E carries the analog signal from IC7 and this is fed via connector 418, resistor R422 and connector 417 to a switch S3. The power supply to the circuitry is through connectors 415 and 416 and it can be seen that connector 18 is linked to the low voltage rail by resistor R423. S3 is a switch for varying the time constant of the analogue signal to one of three values. Depending upon which of the three values is selected ie. which of the lines to connectors 412, 411 or 414 is selected the analog signal has to pass an RC network of resistor R426 and capacitor C48, or resistor R425 and capacitor C47 and R426 and C48, or resistor R424 and capacitor C46 and R425, R426, C47 and C48.

After passage through the low pass filter network comprising the resistors R424, R425 and R426 and capacitors C46, C47 and C48, the analog signal from IC6 is fed to a non-inverting very high input impedance unity gain amplifier 4IC2. The amplifier 4IC2 has associated therewith resistor R427 and capacitor C450. The output of the amplifier 4IC2 is taken via connector 413 to two output socket for a meter and recorder, the respective connections being C1 and E2. A capacitor C451 is connected between the output of 4IC2 and ground. The output of the amplifier IC2 is also taken for the operating voltage for three comparators 4IC3, 4IC4 and 4IC6.

The comparator 4IC3 has associated therewith the following circuit components, resistors R428, R429, R430, variable resistor 4RV5, capacitors C49 and C410 and diode D411. A reference voltage for the comparator 4IC3 is set at 0.2 volts by 4RV5 and the comparator switches to actuate via diode D411 pin 2 of a programmable timer 4IC7 should the output of 4IC2 fall below 0.2 volts. Operation of the programmable timer 4IC7 is described in more detail below.

The comparator 4IC4 has associated therewith the following circuit components, resistors R431, R432, R433 variable resistor 4RV6, capacitors C411 and C412 and a diode D412. A reference voltage for the comparator 4IC4 is set at 2.2 volts by RV6 and the comparator switches to operate via diode D412 pin 2 of the programmable timer 4IC7.

The comparator 4IC6 has associated therewith the following circuit components resistors R437, R438 and capacitors C414 and C415. The reference value for the comparator 4IC6 is provided by integrated circuit 4IC5 and its associated circuit components resistors R434, R435, R436, variable resistors 4RV7 and 4RV8 and capacitor C413 and variable resistor RV10 which is an alarm control and is connected to IC5 via connections 6 and 9. The integrated circuit IC5 is a non-inverting amplifier of gain one to five and the output on pin 6 to the comparator 4IC6 can be varied to any point within the range of the output signal from amplifier 4IC2. The output of 4IC6 switches when the input from 4IC2 falls below the reference value and activates pin 11 of the programmable timer 4IC3.

The programmable timer 4IC7 has the following circuit components associated therewith, resistors R439, R440, R441, and R442, variable resistor RV49, capacitors C416 and C417 the transistor TR47. The programmable timer incorporates an on-chip oscillator set by an external capacitor (C417) and resistor (R440, R441, RV49) and an on-chip monostable circuit adjustable by an external capacitor (C416) and resistor (R439 and R442) to give a variable pulse type output (of in this example 0.1 second). The timer will count from $2°$ to $2^{24}$.

The basic frequency of the oscillator is 131, 072 Hertz, which is set by variation of the variable resistor 49VR. The timer counts down from the basic oscillator frequency to $2^{21}$ to produce output on pin 13 to drive the transistor TR47, which is an emitter follower, with a frequency of one in sixteen seconds. A lamp LP1 is flashed once per sixteen seconds by TR47 in response to the output of pin 13 via circuitry which is described below.

The timer also counts down from the basic oscillator frequency to $2^{17}$ to produce via the output on pin 13 a flash frequency of once per second.

If the logic states on pins 12, 11, 10 and 8 are 1, 1, 0 and 0 respectively, then the count down is $2^{21}$ and if the logic states on pins 12, 11, 10 and 9 are 1, 0, 0 and 0 respectively then the count down is $2^{17}$. As has been explained above, the comparator 4IC6 varies from 11 and consequently when the output of 4IC6 switches low because the input from 4IC2 falls below the reference value, then the flash frequency of LP1 is changed to once per second.

As has also been explained, the output of comparators 4IC3 and 4IC4 are taken to pin 2 and when either of these comparators has a high output to pin 2 then flashing of the lamp LP1 is inhibited. Consequently, if the signal indicative of fluid velocity falls below a minimum value or exceeds a maximum value the flashing of the lamp LP1 is inhibited.

The emitter of the transistor TR47 is connected via connection 8 to drive transistors TR45 and TR46, the emitter of TR47 being connected to their respective bases via resistor R419 and R420. Resistors R418 and R421 which are associated with TR45 and TR46 respectively merely offer a suitable biassing voltage. The transistor TR46 has the lamp LP1 in its collector circuit, the lamp being connected to the collector via connection 14. The transistor TR45 has a relay control R42A in its collector circuit and a diode D410. The relay control is connected to the other side of the lamp LP1 via connection 3 and via three voltage dropping diodes D1, D2 and D3. The relay itself is R12 and is shown across connectors 7 and 6 which feed to alarm terminals A1, B1. Consequently, when the transistor TR47 conducts because of the input to its base from 4IC7, transistors TR45 and TR46 also conduct to energise the lamp LP1.

The fluid flow monitor is also provided with means for self switch off when its battery voltage falls to below a preselected level. Power to the circuitry of FIG. 4 is supplied by a battery (not shown) through connections 4 and 2 to a voltage regulator 41VR and its associated circuit components, resistors R416 and R417, variable resistor RV44 and capacitor C44 and C45. The regulator 41VR, its structure and associated components are similar to the regulator VR1 of FIG. 3 and so will not now be further described.

The supply voltage from the battery is sampled from a resistor R444 and a variable resistor RV42 and fed to an input of an inverting comparator 4IC1. A capacitor C41 is connected in parallel with the variable reactor RV42. A reference voltage for the comparator is taken from between a resistor R45 and a Zener diode ZD41, via a resistor R6 to the other input (3) of the comparator 4IC1. In normal operation of the fluid flow monitor, the sampled voltage from the battery exceeds the reference voltage from the Zener diode. Consequently, the output of the comparator 4IC1 is low and a transistor TR41 controlled by the output of 4IC1 conducts. The controlling voltage for the transistor TR41 is taken from between resistors R48 and R49 which are connected between the output of comparator 4IC1 and the positive supply rail. A relay RL41 makes or breaks the power supply line to the circuitry. The control sides of RL41 are shown at RL41A and RL41B for convenience. Transistors TR42, TR43 and TR44 are instrumental in controlling the relay RL1 together with the associated components, resistors R410, R411, R412, R414, R415 variable resistors RV43, capacitors C42, C43, diodes D4, D5, D6, D7 and D8 and Zener diode ZD2.

In normal operation with a good battery the relay contacts 1-4 are closed and the relay contacts 1-7 are open. Thus the battery is connected to the voltage regulator VR41.

However, suppose the supply voltage falls below the reference value taken from the Zener diode ZD41. The output of the integrated circuit 4IC1 then rises and this switches the transistor TR1 off. The transistor TR2 is then switched off for about ten milliseconds and via the relay control RL1B causes the relay RL1 to open contacts 1-4 and to close contacts 1-7. The relay RL1 is a bistable latching type and so remains in this condition after the ten milliseconds has elapsed.

In order that recovery of the battery voltage owing to the load being taken away does not cause the relay to switch on and off repeatedly ie to 'chatter', the comparator 4IC1 has about 1 volt of hysteresis built in. Moreover the closed of contacts 1-7 causes a load provided by a resistor R43 to be put across the battery.

Suppose now that a new battery is put in to replace the detective low voltage one. This causes the transistor TR1 to switch on and the transistor TR3 to switch on for approximately ten milliseconds. The switch on of the transistor TR3 causes the relay contacts 1-4 to close and 1-7 to open via the relay control RL1A. The relay now remains in this state, and power is provided to the circuitry of the fluid flow monitor.

When the fluid flow monitor is manually switched off, then the transistor TR44 switches on to open the relay contacts of R11, which remain open. An excapsulated capacitor C1 acts as a power source for the transistor TR44 during its switch on time.

An off-on and battery check switch is provided for the fluid flow monitor and this is shown at S1, the switch being divided into four as shown at S1(a), S1(b), S1(c) and S1(d). Adjacent to the switch at S1(c), there is shown a meter M which displays the value of the analog signal from 4IC2 which as explained previously is indicative of fluid velocity.

In the off position, power to the circuitry is removed as has been mentioned above in connection with the transistor TR44. When the switch is turned to battery check, the lamp LP1 and the meter M are connected across the power supply. A series resistance is provided for the meter in the meter at battery check by resistors R42 and R43. The meter has a calibration mark N to which the pointer P should point if the battery is in a sufficiently charged state. The lamp LP1 is also of course turned on.

When the switch S1 is turned to the on position, the battery and lamps are disconnected from across the battery as in the battery check position and normal operation of the monitor begins.

In FIG. 3, the integrated circuits IC1, IC2, IC3, IC6, IC7 and IC8 are of the CA3130 type. Integrated circuits IC4 and IC5 are CD 4001B and DC 4049A1 types, respectively and IC9 and IC10 are both CD4016 type.

From the above description it can be seen that an improved fluid flow monitor is provided, which tends to overcome problems associated with the derivation of spurious high frequency noise.

I claim:

1. A fluid flow monitor comprising a transducer means which is disposable in a fluid flow, the transducer means being constructed to derive an electrical signal including modulations associated with vortices produced in the fluid flow, processing circuit means for processing the electrical signal to remove spurious signals from the electrical signal and derive a further electrical signal related to the fluid flow in response to control signals, and comparator means for comparing said further electrical signal with preselected reference signals, the comparator means having an output dependent upon the comparison with said preselected reference signals, and control means connected to the processing circuit means and the comparator means for providing control signals to the processing circuit means in response to the output of the comparator means.

2. A fluid flow monitor as claimed in claim 1, in which the comparator means comprises a plurality of comparators, each of which can switch at one or more of the preselected reference signals.

3. A fluid flow monitor as claimed in claim 1, further comprising time constant selector means having a variable time constant in operation so that fluctuations of the further signal are removed.

4. A fluid flow monitor as claimed in claim 1, further comprising warning means wherein a warning is given if the further signal falls below a first preselected level.

5. A fluid flow monitor as claimed in claim 1, including failure switch means wherein power to the monitor is cut off if the power supply voltage to the monitor falls below a preselected voltage level.

6. A fluid flow monitor of a type wherein a sonic transmitter transmits a sonic signal into the fluid flow and a sonic receiver receives the sonic signal, the sonic signal being modulated by vortices in the fluid flow, comprising transducer means associated with the sonic receiver for converting the received sonic signal to an electrical signal modulated at the frequency of passage of the vortices, demodulating means for demodulating the electrical signal, processing circuit means for producing an analog electrical signal from the demodulated signal, the analog signal having a magnitude dependent upon the modulation frequency of the electrical signal and comparator means for comparing said analog electrical signal with preselected reference signals, the comparator means being arranged to have an output dependent upon the comparison with said preselected reference signals, and control means connected to the processing circuit means and the comparator means to control the magnitude of the analog electrical signal in response to the output of the comparator means.

7. A fluid flow monitor comprising a transducer means which is disposable in a fluid flow, the transducer means being constructed to derive an electrical signal including modulations associated with vortices produced in the fluid flow, processing circuit means for processing the electrical signal and deriving a further electrical signal dependent upon the fluid flow and comparator means for comparing said further electrical signal with preselected reference signals, the comparator means having an output dependent upon the comparison with said preselected reference signals, in which the processing circuit means includes a variable frequency amplifier in which case the output of the comparator means is communicated to the amplifier to control frequencies amplified by the amplifier.

8. A fluid flow monitor as claimed in claim 7, in which the comparator means includes means for screening out high modulation frequencies when the further signal has a magnitude indicative of a low modulation frequency.

9. A fluid flow monitor as claimed in claim 8, including variable monitoring scales.

10. A fluid flow monitor as claimed in claim 9, further comprising a selector in which selection of the scales can be effected remotely from the monitor.

11. A fluid flow monitor as claimed in claim 10, including means by which selection of different scales does not alter the frequencies which are screened out.

* * * * *